United States Patent
Suzuki et al.

(10) Patent No.: US 10,693,169 B2
(45) Date of Patent: Jun. 23, 2020

(54) SEPARATOR FOR FUEL CELL OR CURRENT COLLECTING MEMBER FOR FUEL CELL, AND MANUFACTURING METHOD THEREOF

(71) Applicant: Plasma Ion Assist Co., Ltd., Kyoto (JP)

(72) Inventors: Yasuo Suzuki, Shiga (JP); Masanori Watanabe, Osaka (JP); Toshiaki Fujii, Kyoto (JP)

(73) Assignee: Plasma Ion Assist Co., Ltd., Kyoto (JP)

( * ) Notice: Subject to any disclaimer, the term of this patent is extended or adjusted under 35 U.S.C. 154(b) by 162 days.

(21) Appl. No.: 15/528,099

(22) PCT Filed: Nov. 17, 2015

(86) PCT No.: PCT/JP2015/082196
§ 371 (c)(1),
(2) Date: May 19, 2017

(87) PCT Pub. No.: WO2016/080372
PCT Pub. Date: May 26, 2016

(65) Prior Publication Data
US 2018/0323461 A1   Nov. 8, 2018

(30) Foreign Application Priority Data
Nov. 20, 2014 (JP) .................. 2014-235946

(51) Int. Cl.
*H01M 8/0228* (2016.01)
*H01M 8/0213* (2016.01)
(Continued)

(52) U.S. Cl.
CPC ....... *H01M 8/1018* (2013.01); *H01M 4/8807* (2013.01); *H01M 4/8871* (2013.01);
(Continued)

(58) Field of Classification Search
None
See application file for complete search history.

(56) References Cited

U.S. PATENT DOCUMENTS

| 8,844,140 B2 * | 9/2014 | Beer | F16C 33/32 |
| | | | 148/230 |
| 2004/0058226 A1 * | 3/2004 | Lamarre | H01M 4/8605 |
| | | | 429/431 |

(Continued)

FOREIGN PATENT DOCUMENTS

| JP | 2002-358974 | 12/2002 |
| JP | 2003-268567 | 9/2003 |

(Continued)

OTHER PUBLICATIONS

"International Search Report (Form PCT/ISA/210) of PCT/JP2015/082196", dated Feb. 23, 2016, with English translation thereof, pp. 1-6.

*Primary Examiner* — Scott J. Chmielecki
(74) *Attorney, Agent, or Firm* — JCIPRNET

(57) ABSTRACT

In order to provide a separator for fuel cells, or a current collecting member for fuel cells, which has low contact resistance, excellent corrosion resistance and which can be economically manufactured, and a manufacturing method thereof, this separator 110 for fuel cells comprises a substrate 11 having iron or aluminum as the main component, a gas barrier film 12 formed directly on said substrate 11 and having excellent corrosion resistance, and a conductive resin film 13 formed on the gas barrier film 12 and containing a conductive ceramic or graphite particles having a particle diameter of 1-20 μm.

5 Claims, 5 Drawing Sheets

(51) Int. Cl.
  *H01M 8/0221* (2016.01)
  *H01M 8/1018* (2016.01)
  *H01M 8/0254* (2016.01)
  *H01M 8/021* (2016.01)
  *H01M 4/88* (2006.01)
  *H01M 8/04701* (2016.01)
  *H01M 8/04746* (2016.01)

(52) U.S. Cl.
  CPC ......... *H01M 8/021* (2013.01); *H01M 8/0228* (2013.01); *H01M 8/0254* (2013.01); *H01M 8/04701* (2013.01); *H01M 8/04746* (2013.01); *H01M 8/0213* (2013.01); *H01M 8/0221* (2013.01); *H01M 2008/1095* (2013.01); *Y02P 70/56* (2015.11)

(56) References Cited

U.S. PATENT DOCUMENTS

| | | | | |
|---|---|---|---|---|
| 2004/0081881 A1* | 4/2004 | Vyas | ............... | C23C 30/00 429/509 |
| 2005/0180721 A1* | 8/2005 | Hayashi | ............... | H01L 51/5237 385/147 |
| 2005/0221000 A1* | 10/2005 | Ikeda | ............... | C23C 16/02 427/248.1 |
| 2006/0228606 A1* | 10/2006 | Fiebig | ............... | H01M 8/0297 429/410 |
| 2008/0050635 A1* | 2/2008 | Gao | ............... | C23C 8/26 429/509 |
| 2009/0325369 A1* | 12/2009 | Kim | ............... | H01L 21/28247 438/585 |
| 2010/0075150 A1* | 3/2010 | Takahashi | ............... | C23C 16/345 428/411.1 |
| 2010/0159240 A1* | 6/2010 | Shah | ............... | B22F 3/002 428/368 |
| 2011/0006354 A1* | 1/2011 | Jangjian | ............... | H01L 29/4966 257/314 |
| 2011/0065024 A1* | 3/2011 | Jeon | ............... | H01M 8/0206 429/514 |
| 2011/0171564 A1* | 7/2011 | Blunk | ............... | H01M 8/021 429/518 |
| 2012/0100722 A1* | 4/2012 | Asai | ............... | C23C 16/08 438/758 |
| 2013/0101495 A1* | 4/2013 | Peterson | ............... | B82Y 40/00 423/447.2 |
| 2014/0349216 A1* | 11/2014 | Nguyen | ............... | H01G 11/36 429/532 |
| 2015/0137108 A1* | 5/2015 | Iwase | ............... | C23C 14/562 257/40 |
| 2015/0376792 A1* | 12/2015 | Spurlin | ............... | C25D 5/34 438/798 |
| 2016/0118680 A1* | 4/2016 | Haydn | ............... | H01M 8/1246 429/482 |
| 2016/0233523 A1* | 8/2016 | Koizumi | ............... | H01M 8/0213 |
| 2017/0088945 A1* | 3/2017 | Chueh | ............... | C23C 14/08 |

FOREIGN PATENT DOCUMENTS

| | | |
|---|---|---|
| JP | 2003-272659 | 9/2003 |
| JP | 2004-014272 | 1/2004 |
| JP | 2004-111079 | 4/2004 |
| JP | 2005-276807 | 10/2005 |
| JP | 2006-156385 | 6/2006 |
| JP | 2006-172719 | 6/2006 |
| JP | 2007-324146 | 12/2007 |
| JP | 2008-204876 | 9/2008 |
| JP | 2009-064589 | 3/2009 |
| JP | 2011-198573 | 10/2011 |
| JP | 2013-004511 | 1/2013 |
| JP | 2012-146616 | 8/2013 |
| JP | 2013-178914 | 9/2013 |
| JP | 2014-080685 | 5/2014 |
| WO | 2005124910 | 12/2005 |

* cited by examiner

SEPARATOR FOR FUEL CELL OR CURRENT COLLECTING MEMBER FOR FUEL CELL, AND MANUFACTURING METHOD THEREOF

CROSS-REFERENCE TO RELATED APPLICATION

This application is a 371 application of the International PCT application serial no. PCT/JP2015/082196, filed on Nov. 17, 2015, which claims the priority benefit of Japan application no. 2014-235946, filed on Nov. 20, 2014. The entirety of each of the abovementioned patent applications is hereby incorporated by reference herein and made a part of this specification.

TECHNICAL FIELD

The present invention relates to a separator for a solid polymer electrolyte fuel cell and a current collecting member for a solid polymer electrolyte fuel cell which have excellent corrosion resistance and low electrical contact resistance between the separator and carbon paper (GDL: gas diffusion layer) and are inexpensive, and a method of manufacturing the same.

BACKGROUND ART

In recent years, fuel cells have been focused upon as energy sources for addressing global environmental problems and energy problems. In particular, since solid polymer electrolyte fuel cells can operate at low temperatures and can be reduced in size and weight, applications thereof to residential fuel cell and fuel cell for vehicles have been studied.

A separator is one of important components of a general solid polymer fuel cell. Characteristics required for the separator include excellent corrosion resistance in an acidic solution, high mechanical strength with respect to vibration and the like, low contact resistance between the separator and carbon paper for anode and cathode electrodes, easily in groove processing and the like, being lightweight, and low costs.

Recently, metal plates such as a stainless steel plate have been mainly studied as a substrate of a separator that has the above characteristics. In a separator using a metal such as stainless steel, titanium, or an alloy thereof, when an anti corrosion film is formed on a surface, corrosion resistance is obtained, but it is not necessarily sufficient. In addition, it is known that, since an anti corrosion film increases contact resistance between the separator and anode electrode and between the separator and cathode electrode, conductivity deteriorates and power generation efficiency of a fuel cell decreases. In addition, since materials such as stainless steel, titanium, or an alloy thereof are expensive, there are serious problems in practicality for, for example, a vehicle fuel cell.

Meanwhile, while the metals aluminum and magnesium have been studied as a lightweight and inexpensive separator substrate, it is known that, since an insulating oxide film is likely to be formed on a surface of a substrate, corrosion resistance is not likely to be sufficient, eluted ions are likely to deteriorate catalyst characteristics, and the ion conductivity of a solid polymer film is likely to be reduced, and as a result, power generation characteristics deteriorate.

In addition, the above-described problems may also occur similarly in a current collecting member for a fuel cell.

Patent Literature 1 discloses a technology for a separator for a fuel cell including a coating layer having an amorphous carbon layer and a conductive portion on a metal substrate. The separator includes an insulating amorphous carbon layer and a coating layer that includes an amorphous carbon layer and a conductive portion formed of graphite fine particles.

In order to improve corrosion resistance of an aluminum material, Patent Literature 2 discloses a technology for a separator for a fuel cell in which a copper layer is formed on a surface of a substrate made of pure aluminum or an aluminum alloy using a wet plating method, a tin layer is laminated on the surface using a wet plating method, and a metal layer made of one or more metals selected from the group consisting of titanium, vanadium, chromium, zirconium, niobium, molybdenum, hafnium, tantalum, and tungsten or an alloy based on these metals is further incorporated using a dry deposition method such as vacuum deposition.

In addition, Patent Literature 3 discloses a technology for a separator for a fuel cell in which an aluminum substrate, a zinc layer that is directly formed on the substrate and contains zinc particles having a particle size of less than 0.1 μm, a nickel plating layer that is directly formed on the zinc layer, and a conductive resin layer that is directly formed on the nickel plating layer and contains scaly or needle-like graphite particles having a long diameter of 1 μm to 100 μm are laminated with thicknesses of 5 μm to 30 μm.

CITATION LIST

Patent Literature

[Patent Literature 1]
  Japanese Unexamined Patent Application Publication No. 2008-204876
[Patent Literature 2]
  Japanese Unexamined Patent Application Publication No. 2011-198573
[Patent Literature 3]
  Japanese Unexamined Patent Application Publication No. 2013-178914

SUMMARY OF INVENTION

Technical Problem

The separator for a fuel cell disclosed in Patent Literature 1 has a problem in that, since amorphous carbon is an insulating film, contact resistance between the separator and a gas diffusion electrode material (for example, carbon paper) is 10 mΩ·cm$^2$ or more and it is not possible to sufficiently decrease this. In addition, while the amorphous carbon coating layer is known to have excellent corrosion resistance, it is difficult to completely prevent generation of micro-defects such as pinholes which cause degradation in corrosion resistance. Accordingly, a serious manufacturing problem is caused.

The method disclosed in Patent Literature 2 has a complicated manufacturing process and the same problem as in Patent Literature 1. In addition, while the method disclosed in Patent Literature 3 is known to allow excellent corrosion resistance, since a conductive resin layer having a thickness of 5 μm to 30 μm is laminated, it is difficult to reduce the contact resistance between the separator and the electrode to 5 mΩ·cm$^2$ or less. It is necessary to further reduce the contact resistance.

In view of the above-described problems, the present invention provides a separator for a solid polymer electrolyte fuel cell or a current collecting member for a solid polymer electrolyte fuel cell having excellent corrosion resistance and low contact resistance at low cost and a method of manufacturing the same. In addition, the separator for a fuel cell or the current collecting member for a fuel cell manufactured according to the present invention and a solid polymer electrolyte fuel cell using the separator for a fuel cell or the current collecting member for a fuel cell are provided at low cost.

Solution to Problem

In order to address the above problems, the present invention provides the following separator for a fuel cell or current collecting member for a fuel cell, and a method of manufacturing the separator for a fuel cell or the current collecting member for a fuel cell.

An invention according to claim 1 is a separator for a fuel cell or a current collecting member for a fuel cell including:

a substrate including at least one metal among aluminum (Al), iron (Fe), zinc (Zn), magnesium (Mg), chromium (Cr), zirconium (Zr), nickel (Ni), titanium (Ti), and an alloy containing these metals;

a gas barrier film that is formed on at least one side of the substrate; and a conductive resin film that is formed on a surface of the gas barrier film.

In this case, when the gas barrier film and the conductivity film are laminated, it is possible to substantially seal, for example, defects such as pinholes formed in the gas barrier film, and increase corrosion resistance. In addition, when the conductive resin film is formed on a surface of the gas barrier film, it is possible to reduce contact resistance.

Here, the use of, for example, an oxycarbide or other thin film is conceivable to seal the above-described defects. However, in this case, when a structure of a defective portion is concealed by, for example, the shade like dust, it may not be possible to reliably perform sealing in the above-described thin film and it may not be possible to compensate for corrosion resistance.

On the other hand, if the conductive resin film is slightly thick (1 μm or more), it can cover the shade of defective portions concealed by dust. Therefore, it is possible to reliably prevent a corrosive liquid from entering the defective portions.

An invention according to claim 2 is the separator for a fuel cell or the current collecting member for a fuel cell in which the gas barrier film according to claim 1 is a conductive carbon film, a metal carbide film, a metal oxycarbide film, a metal nitride film, a metal boride film, a metal silicide film, or a film obtained by laminating these films, or a combination of these films.

An invention according to claim 3 is the separator for a fuel cell or the current collecting member for a fuel cell in which the gas barrier film according to claim 1 or 2 is a conductive carbon film which is conductive amorphous carbon or conductive diamond-like carbon having a resistivity of 0.01 Ω·cm to 10 Ω·cm.

In this case, it is possible to set a resistivity of the conductive carbon film to be in an industrially easily achievable range, while reducing an internal resistance of the fuel cell and reducing a power loss.

An invention according to claim 4 is the separator for a fuel cell or the current collecting member for a fuel cell in which the gas barrier film according to any one of claims 1 to 3 has a thickness of 10 nm to 500 nm.

In this case, it is possible for an effect of a gas barrier film to be sufficiently exhibited while a long film generation time is not required, and productivity is ensured.

An invention according to claim 5 is the separator for a fuel cell or the current collecting member for a fuel cell in which the conductive resin film according to any one of claims 1 to 4 is a conductive resin film that includes graphite particles having a particle size of 1 μm to 20 μm or/and a conductive ceramic and having a weight fraction of 30 weight % to 70 weight %.

The above-described range is preferable as a weight fraction because, when the weight fraction is too high, cracks occur in a surface of the conductive resin film, and when the weight fraction is too low, the contact resistance increases.

An invention according to claim 6 is the separator for a fuel cell or the current collecting member for a fuel cell in which the conductive resin film according to any one of claims 1 to 5 has a thickness of 1.0 μm to 30.0 μm.

In this case, it is possible reduce a manufacturing time and manufacturing costs while ensuring corrosion resistance of the conductive resin film.

An invention according to claim 7 is a method of manufacturing a separator for a fuel cell or a current collecting member for a fuel cell including:

(a) process in which a metal substrate for the fuel cell is transferred into a plasma treatment device and a surface of the metal substrate is cleaned using a plasma treatment method;

(b) process in which the metal substrate is heated to 100° C. to 450° C.;

(c) process in which a gas barrier film is formed on a surface of the metal substrate; and (d) process in which a conductive resin film is formed on a surface of the gas barrier film.

In this case, it is possible to manufacture a separator for a fuel cell or a current collecting member for a fuel cell that exhibits the above-described operations and effects.

An invention according to claim 8 is the method of manufacturing a separator for a fuel cell or a current collecting member for a fuel cell in which a raw material gas required for foil ling a conductive carbon film is introduced into the plasma treatment chamber and a discharge plasma containing carbon ions is generated, the metal substrate is exposed to the discharge plasma, a negative bias voltage is applied to the metal substrate, and a gas barrier film including the conductive carbon film is formed.

In this case, it is possible to reliably obtain the conductivity necessary for the separator for a fuel cell or the current collecting member for a fuel cell.

An invention according to claim 9 is the method of manufacturing a separator for a fuel cell or a current collecting member for a fuel cell in which the gas barrier film including any of a metal carbide, a metal oxycarbide, a metal nitride, a metal boride, and a metal silicide or a mixture thereof is formed on a surface of the metal substrate using a chemical vapor deposition method.

An invention according to claim 10 is the method of manufacturing a separator for a fuel cell or a current collecting member for a fuel cell in which a desired metal film is formed on a surface of the metal substrate using a vacuum deposition method or a chemical vapor deposition method, and in a plasma atmosphere including at least one type of ions selected from among carbon ions, oxygen ions, nitrogen ions, boron ions and silicon ions, when a negative bias voltage is applied to the metal substrate and the ions are implanted, the gas barrier film including any of a metal carbide, a metal oxycarbide, a metal nitride, a metal boride, and a metal silicide or a mixture thereof is formed.

An invention according to claim 11 is the method of manufacturing a separator for a fuel cell or a current collecting member for a fuel cell in which the gas barrier film according to claim 8 is formed such that a metal hexacarbonyl gas including a desired metal is introduced into the plasma treatment chamber as a raw material gas, and a temperature of the substrate remains at 130° C. to 450° C. in an atmosphere in which the gas is included, and a desired metal film, metal carbide film, or metal oxycarbide film or a mixture film thereof is formed using a chemical CVD method.

An invention according to claim 12 is a solid polymer electrolyte fuel cell using the separator for a fuel cell or the current collecting member for a fuel cell according to any one of claims 1 to 6 or the separator for a fuel cell or the current collecting member for a fuel cell manufactured using the manufacturing method according to any one of claims 7 to 11.

In this case, it is possible to obtain the same operations and effects as in the above-described separator for a fuel cell or current collecting member for a fuel cell.

Advantageous Effects of Invention

According to the present invention, when a gas barrier film and a conductive resin film are laminated on a surface of an inexpensive metal substrate made of aluminum or iron, it is possible to provide a separator or a current collecting member for a solid polymer electrolyte fuel cell which has excellent corrosion resistance and low contact resistance. In addition, it is possible to provide a manufacturing method that is excellent for productivity. Furthermore, it is possible to provide a solid polymer electrolyte fuel cell using the separator or current collecting member for a fuel cell manufactured according to the present invention and an electrode member for the fuel cell at low cost.

REFERENCE SIGNS LIST

Figure 1:
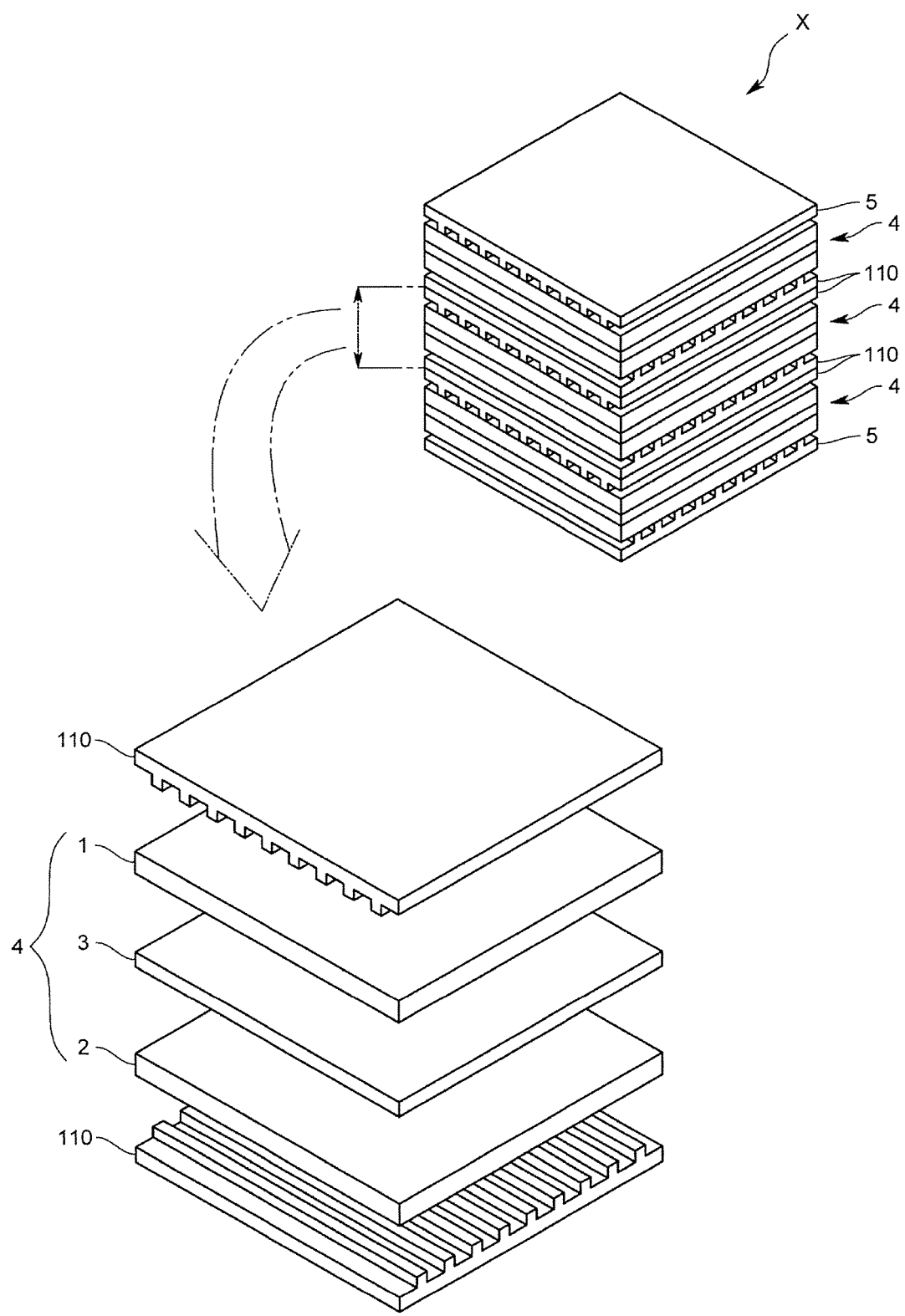
FIG. 1 is a schematic view of a solid polymer electrolyte fuel cell according to the present invention.

X Solid polymer electrolyte fuel cell
110 Separator for fuel cell
11 Metal substrate
12 Gas barrier film
13 Conductive resin film
200 Plasma treatment device

DESCRIPTION OF EMBODIMENTS

First, a solid polymer electrolyte fuel cell X of the present embodiment will be described.

The solid polymer electrolyte fuel cell X is used in, for example, a fuel cell vehicle, and is formed of a laminate of cells 4 that include a fuel electrode 1, an air electrode 2 and an electrolyte 3 interposed therebetween as shown in FIG. 1. In addition, a current collecting member 5 is provided in an upper part and a lower part, and a separator 110 is provided between a cell 4 and a cell 4.

Although the current collecting member 5 is formed to be thicker than the separator 110, it is manufactured using the same manufacturing method as the separator 110 and has the same configuration as the separator 110.

The current collecting member 5 and a separator for a fuel cell 110 of the present embodiment which is an example of the separator 110 will be described below with reference to the drawings.

Figure 2A:
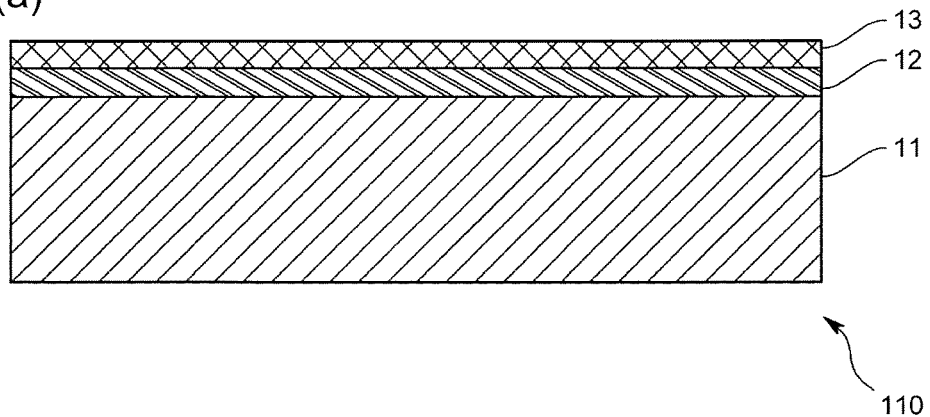
FIGS. 2(a) to 2(c) are a cross-sectional schematic view of a separator for a fuel cell according to the present invention.

FIG. 2(a) is a cross-sectional schematic view of the separator for a fuel cell 110 according to the present invention. The separator 110 includes a gas barrier film 12 that is formed on at least one main surface of a metal substrate 11 and a conductive resin film 13 that is laminated on a surface of the gas barrier film. In the present invention, the gas barrier film 12 and the conductive resin film 13 are laminated on a surface of the inexpensive metal substrate 11 made of aluminum or iron so that corrosion resistance is improved and contact resistance is reduced. The gas barrier film 12 used in the present invention is a film that has conductivity, and prevents penetration of oxygen and water vapor, and may be a conductive carbon film, a metal carbide film, a metal oxycarbide film, a metal nitride film, a metal boride film, or a metal silicide film.

For example, in a configuration of the related art in which the conductive resin film 13 is directly laminated on a surface of an aluminum or iron substrate that is easily oxidized, although the conductive resin film 13 has excellent chemical resistance, water vapor or oxygen easily penetrates thereinto and an insulating oxide film is generated on a surface of the aluminum or iron substrate, which results in an increase in contact resistance.

On a surface of the metal substrate 11, the gas barrier film 12, for example, a diamond-like carbon film having conductivity (hereinafter referred to as a conductive DLC film), an amorphous carbon film having conductivity (hereinafter referred to as a conductive a-C film), or a metal carbide film or a metal oxycarbide film that is unlikely to be oxidized is interposed. Therefore, it is possible to maintain corrosion resistance and low contact resistance. The conductive DLC film and the conductive a-C film exhibit excellent corrosion resistance in an acidic or alkaline solution and also have an excellent gas barrier property. However, as shown in FIG. 2(c), many irregularities and defective portions 16 are formed in the surface of the metal substrate 11. Even if the conductive DLC film or the conductive a-C film is formed as the conductive carbon film, it is difficult to completely cover the defective portions 16 such as a pinhole, which is a main factor that causes reduction in corrosion resistance. However, when the gas barrier film 12 is formed on a surface of the metal substrate 11 and the surface is covered with the conductive resin film 13, it is possible to substantially seal the defective portions 16 of the gas barrier film 12, suppress diffusion of oxygen or water vapor in an acidic solution or an alkaline solution to prevent oxidation and corrosion of the surface of the metal substrate 11, and suppress an increase in contact resistance.

According to the present invention, as the metal substrate 11, an inexpensive metal substrate made of aluminum, iron, zinc or magnesium, an alloy substrate including such a metal as a main component, or a laminated substrate of such metals can be used. It should be noted that an expensive metal substrate made of titanium, nickel, or a stainless steel material can be used.

As an aluminum substrate 11, high purity aluminum having a purity of 99.0 weight % or more, for example, JIS standard 1000 series alloys (industrial pure aluminum) can be used. The high purity aluminum has a high thermal conductivity (about 200 W/m·K), which is appropriate for the separator 110. In consideration of corrosion resistance, processability, mechanical strength, and the like, an aluminum alloy is preferable. In consideration of corrosion resistance and processability, 3000 series alloys (Al—Mn alloys), 5000 series alloys (Al—Mg alloys), 6000 series alloys (Al—Mg—Si alloys), or 8000 series alloys (Al—Fe—Si alloys) can be used.

Figure 2B:
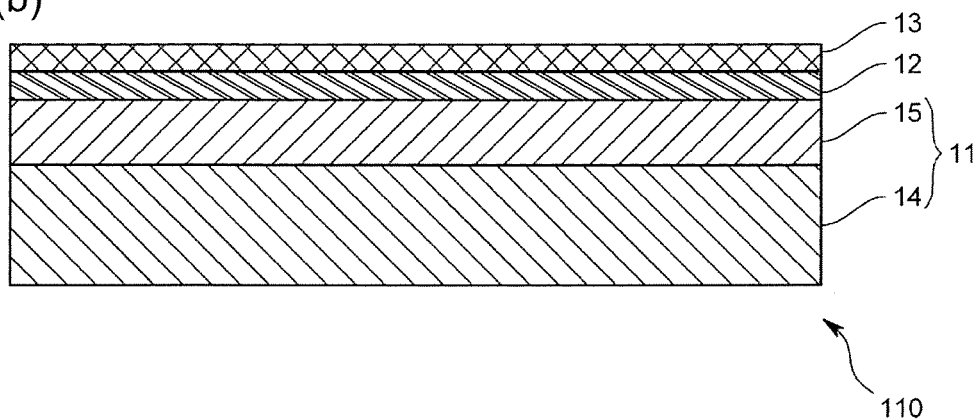
Figure 2C:
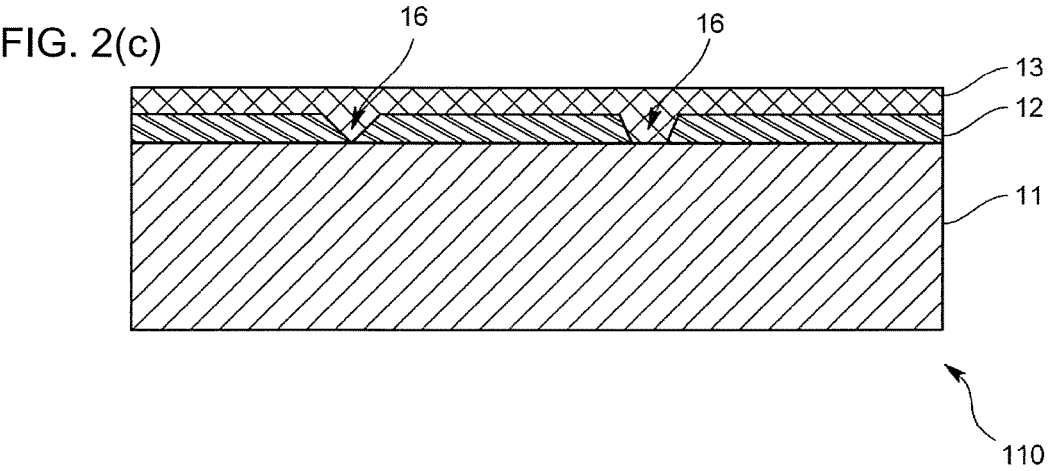

In addition, as shown in FIG. 2(*b*), for example, a laminated metal substrate 11 including core metal 14 made of an iron material or an alloy including iron as a main component and a high purity aluminum or aluminum alloy layer 15 or a nickel or titanium layer 15 which is laminated on a surface thereof, or a laminated metal substrate 11 plated with zinc or magnesium can be used. For example, when an aluminum material (including high purity aluminum and an aluminum alloy) is laminated on a surface of an iron substrate using a hot plating method or the like, it is possible to realize practical applications for the laminated type separator 110 having excellent thermal conductivity and high mechanical strength.

It is preferable that the conductive carbon film serving as the gas barrier film 12 have low resistivity. However, in the conductive DLC film, the resistivity is limited to about 1 mΩ·cm. An appropriate range of the resistivity of the conductive DLC film is 1 mΩ·cm to 100 Ω·cm, and a more appropriate range is 1 mΩ·cm to 1 Ω·cm. This is because, when the resistivity of the conductive DLC film is too high, since an internal resistance of a fuel cell becomes higher, a power loss becomes greater, which is not practical.

In addition, an appropriate range of the thickness of the conductive DLC film is 10 to 500 nm, and a more appropriate range is 30 to 300 nm. When the thickness is 10 nm or less, an effect of the gas barrier film 12 is not sufficiently obtained. When the thickness is 300 nm or more, a film formation time becomes longer, which is disadvantageous for productivity.

A material of the gas barrier film 12 is not particularly limited to conductive carbon, and may be a material in which no insulating metal oxide film is generated due to a chemical reaction with oxygen gas or water vapor when used. For example, a metal carbide film or a metal oxycarbide film including a transition metal such as chromium, zirconium, and nickel can be used. Oxygen or water vapor that diffuses into the conductive resin film 13 and reaches a surface of the gas barrier film 12 does not chemically react with a metal carbide or metal oxycarbide film 12 at 100° C. or lower, does not diffuse further and penetrate the surface of the metal substrate 11 to generate an insulating oxide film, and a change (increase) in contact resistance over time can be prevented.

As a specific compound gas barrier film 12, chromium carbide (CrC), nickel carbide (NiC), zirconium carbide (ZrC), tungsten carbide (WC), molybdenum carbide ($Mo_2C$), and titanium carbide (TiC) metal carbide films, and chromium oxycarbide (CrCO), nickel oxycarbide (NiCO), tungsten oxycarbide (WCO), molybdenum oxycarbide (MoCO), and titanium oxycarbide (TiCO) metal oxycarbide films may be exemplified.

According to the present invention, the gas barrier film 12 may be a mixture of a metal carbide and a metal oxycarbide and a ratio therebetween is arbitrary. It is known that many types of metal carbide have a resistivity of 0.1 mΩ·cm or less, and chromium oxycarbide has a resistivity of about 0.2 mΩ·cm. As a metal oxycarbide film, a metal oxycarbide film including chromium oxycarbide as a main component is appropriate. The thicknesses of the metal carbide film and the gas barrier film 12 including chromium oxycarbide as a main component have not been specified. However, in consideration of productivity, the thickness is 1 μm or less and preferably 10 nm to 500 nm.

Furthermore, in addition to a metal carbide film and a metal oxycarbide film, a metal nitride film, a metal boride film, and a metal silicide film which have a resistivity of less than 1 Ω·cm, have conductivity, and have excellent corrosion resistance can be used.

As specific examples of a metal nitride film, a chromium nitride ($Cr_2N$) film, a nickel nitride (NiN) film, a zirconium nitride (ZrN) film, a tantalum nitride (TaN) film, a vanadium nitride (VN) film and a titanium nitride (TiN) film may be exemplified.

As a metal boride film, a chromium boride (CrB) film, a zirconium boride (ZrB) film, a tantalum boride (TaB) film, a molybdenum boride (MoB) film, a niobium boride ($NbB_2$) film and a titanium boride (TiB) film may be exemplified.

As specific examples of a metal silicide film, a chromium silicide ($CrSi_2$) film, a zirconium silicide ($ZrSi_2$) film, a tantalum silicide ($TaSi_2$) film, a molybdenum silicide ($MoSi_2$) film, a niobium silicide ($NbSi_2$) film and a titanium silicide ($TiSi_2$) film may be exemplified.

The conductive resin film 13 includes a conductive filler such as graphite particles and a conductive ceramic powder and a binder resin. In the related art, needle-like or flat scaly graphite particles having a long diameter of 1 μm to 100 μm are used as conductive filler particles in the binder resin. The contact resistance depends on a weight fraction of graphite particles and 30 weight % to 70 weight % is generally appropriate. When a volume fraction of graphite particles included in the conductive resin film 13 is 70% or more, cracks occur in the surface, and when a weight fraction is 30% or less, the contact resistance is 50 mΩ·cm$^2$ or more, which is not preferable. In addition, the thickness of the conductive resin film 13 is preferably 5 μm to 30 μm. When the thickness is less than 5 μm, sufficient corrosion resistance is not obtained and when the thickness exceeds 30 μm, a time required for formation is unnecessarily longer. As a binder resin forming the conductive resin film 13, various binder resins such as a phenolic resin and an epoxy resin may be exemplified. Among these, a phenolic resin and a fluorine resin are preferable.

According to the present invention, when the gas barrier film 12 is interposed between the metal substrate 11 and the conductive resin film 13, it is possible to significantly increase corrosion resistance. In addition, when a granular graphite powder having a low resistance value in a film thickness (vertical) direction and having a particle size of 1 μm to 30 μm and/or a metal carbide or a metal nitride conductive ceramic powder are used as conductive fillers for the conductive resin film 13, the thickness of the conductive resin film 13 can be set to 15 μm or less, and the contact resistance can be reduced to about 5 mΩ·cm². An appropriate thickness of the conductive resin film 13 is 1 μm to 30 μm and a more appropriate thickness is 3 μm to 15 μm.

As the conductive filler, in addition to the granular graphite powder and the conductive ceramic powder of a metal carbide or a metal nitride, a conductive ceramic such as a metal oxycarbide, a metal oxynitride, a metal boride and a metal silicide can be used.

According to the above-described configuration, for example, compared to when a sealing treatment for pinholes or micro-defects of a DLC film is performed using an oxycarbide or another thin film, when the conductive resin film 13 is used, it is possible to significantly increase corrosion resistance. This is thought to be caused by the fact that, if the conductive resin film 13 is slightly thicker (1 μm or more) than an oxycarbide or another thin film, it can cover defective portions caused by concealment by dust, and thus prevent a corrosive liquid from entering the defective portions.

In addition, since graphite is used as a conductive filler, the conductive resin film 13 is chemically stable.

Further, when a phenolic resin is used as the binder resin, it is possible to increase adhesiveness between the binder resin and the substrate. In addition, when a fluorine resin is used as the binder resin, the binder resin can have excellent heat resistance, corrosion resistance, and water repellency.

A method of manufacturing the separator for a fuel cell 110 according to the present invention is divided roughly into two processes, a process of forming the gas barrier film 12 using a chemical vapor deposition method or the like and a process of forming the conductive resin film 13 using a dipping method, a spray method, an electrodeposition method, or the like. The chemical vapor deposition method used in the present invention includes a thermal CVD method, a plasma CVD method, a sputtering method, a reactive sputtering method and an ion plating method.

An embodiment of the method of manufacturing the separator for a fuel cell 110 according to the present invention will be described below with reference to the drawings.

Figure 3:
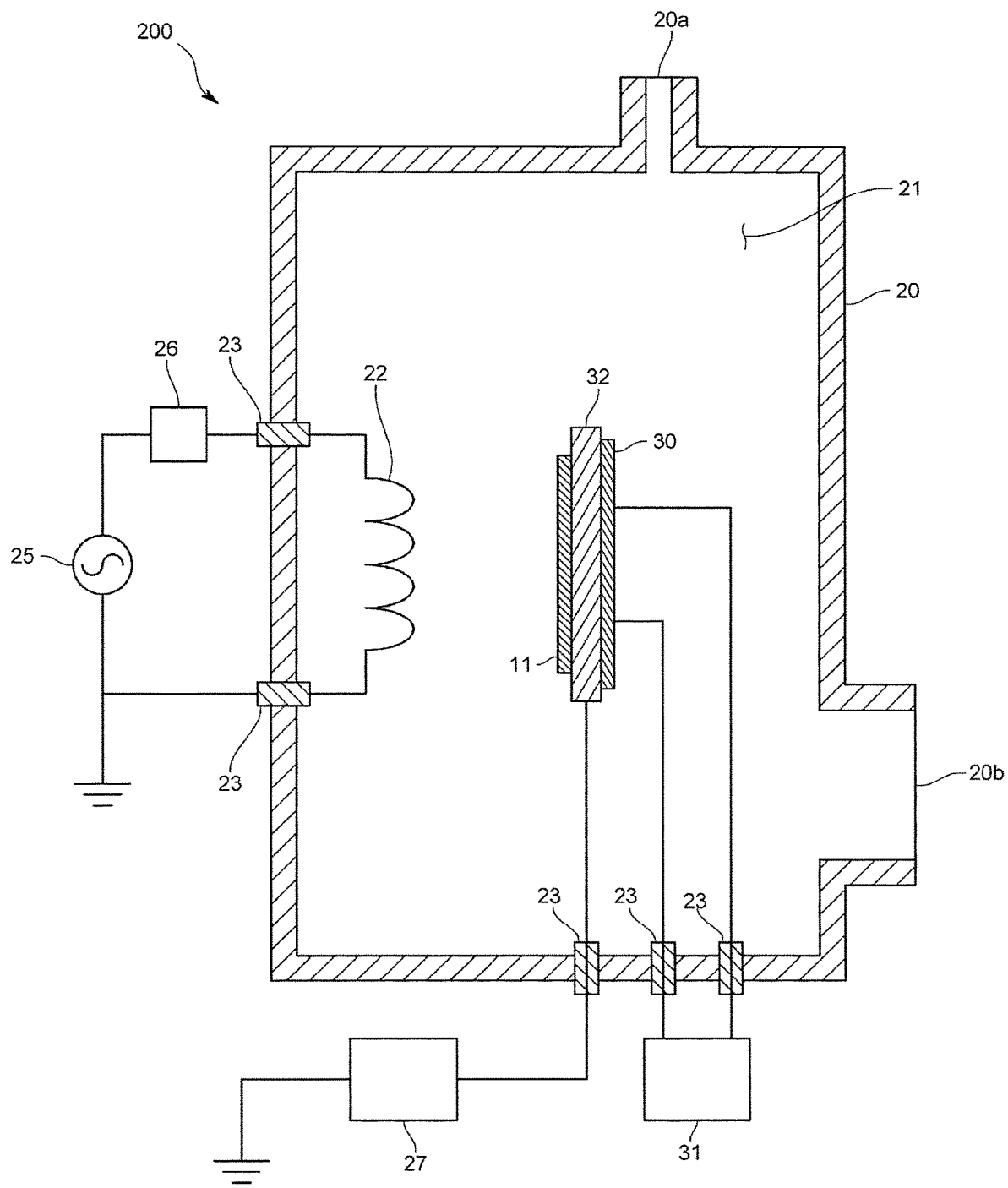
FIG. 3 is a schematic view of a configuration of a main part of a plasma treatment device according to the present invention.

FIG. 3 is a schematic view of a plasma treatment device 200 used to form the gas barrier film 12. An inductively coupled high frequency antenna 22 for exciting a high frequency discharge plasma is introduced to a side plate of a vacuum chamber 20 of the plasma treatment device 200 through a feedthrough 23. A substrate mounting jig 32 for locking the metal substrate 11 which faces the inductively coupled high frequency antenna 22 is installed substantially parallel to the high frequency antenna 22 inside a plasma treatment chamber 21. The metal substrate 11 is heated to a predetermined temperature on a heating plate 30 with the substrate mounting jig 32 therebetween using a temperature controller 31. The metal substrate 11 is connected to a bias power supply 27 through the substrate mounting jig 32 and the feedthrough 23. The high frequency antenna 22 includes one end that is connected to a high frequency power source 25 through a matching circuit 26 and another end that is grounded. 20a indicates an inlet for an operation gas, and 20b indicates an outlet therefor.

In the process of forming the gas barrier film 12, the metal substrate 11 for a fuel cell is transferred into the plasma treatment chamber 21 using, for example, a chain drive mechanism (not shown), the inside of the plasma treatment chamber 21 is exhausted to a high vacuum using a vacuum exhaust unit (not shown), the metal substrate 11 is heated to 100° C. to 450° C. using, for example, the heating plate 30, and sufficient gas is discharged. Next, for example, a mixed gas of argon and hydrogen is introduced into the plasma treatment chamber 21 and remains at a predetermined gas pressure, high frequency power is supplied to the high frequency antenna 22 from the high frequency power source 25 through the matching circuit 26, and a discharge plasma is generated in the plasma treatment chamber 21. On the other hand, a negative pulse voltage of, for example, 5 to 15 kV, is applied to the metal substrate 11 from the bias power supply 27 through the substrate mounting jig 32. The surface of the metal substrate 11 is ion bombarded to clean the surface of the metal substrate 11. Cleaning can be performed using a plasma treatment method that is a so-called plasma-based ion implantation (PBII) method.

In a method of forming a conductive carbon film serving as the gas barrier film 12, contaminants on the surface of the metal substrate 11 and a metal oxide film are removed in the cleaning process, a temperature of the metal substrate remains at 250 to 400° C., and a mixed gas of, for example, methane and acetylene, is introduced into the plasma treatment chamber 21 as a raw material gas. In the same manner as in the cleaning process, high frequency power is supplied to the high frequency antenna 22, a discharge plasma containing carbon ions is generated in the vicinity of the surface of the metal substrate 11, and a negative DC voltage or a negative pulse voltage is applied to the metal substrate 11. Therefore, the conductive DLC film or the a-C film can be formed.

As the raw material gas, a raw material gas including at least one selected from the group consisting of hydrocarbon compounds such as methane, ethane, ethylene, acetylene, benzene, toluene, cyclohexane, and benzene as a main component can be used. A gas pressure is 0.1 to 100 Pa, and preferably 0.3 to 30 Pa. High frequency power is supplied to the high frequency antenna 22 from the high frequency power source 25 through the matching circuit 26 to generate a discharge plasma, and a negative bias voltage is simultaneously applied to the metal substrate 11 to form the conductive DLC film 12. In addition, as necessary, hydrogen gas, argon gas, nitrogen gas, a boron compound gas, or the like can be added.

As the high frequency power source 25, a high frequency power source of 10 MHz to 60 MHz, for example, 13.56 MHz, with an output of 300 W to 5 kW is preferably used. As the bias power supply 27, a bias power supply that has a repetition frequency of 0.5 kHz to 5 kHz and an output voltage of 300 V to 15 kV, and can supply a negative pulse voltage can be used. In addition, a bias power supply that has a frequency of 10 kHz to 500 kHz and can apply a negative pulsating voltage of −300 V to −1 kV with respect to a plasma potential can be used. In addition, a pulsating power supply has preferably a frequency of 30 kHz to 200 kHz.

According to the present invention, when the conductive DLC film serving as the gas barrier film 12 is formed, a discharge plasma of the raw material gas is mainly generated by the high frequency power, and the bias voltage is applied, and thus the conductive DLC film having a desired resistivity can be formed. In addition, when a raw material gas obtained by mixing nitrogen gas or a boron compound gas with the hydrocarbon compound gas is used as the raw material gas, it is possible to form a conductive DLC film containing nitrogen or boron, and it is possible to form a gas barrier film 12 having better conductivity.

In a method of forming another gas barrier film 12 according to the present invention, a desired metal film, for example, a chromium metal film, is formed on a surface of the metal substrate 11 using a vacuum deposition method, a sputtering method, or the like. Next, as a raw material gas, a mixed gas of a hydrocarbon compound gas, for example, acetylene gas, and hydrogen is introduced into the plasma treatment chamber 21. In the same manner as in the cleaning process, a negative pulse voltage (a bias voltage) of 5 to 15 kV is supplied to the metal substrate 11, a discharge plasma containing carbon ions is generated in the vicinity of the metal substrate 11, and carbon ions are implanted into the chromium metal film. When carbon ions are implanted, a chromium carbide film can be formed on a surface of the chromium metal film. The thickness of the chromium carbide film depends on a peak value of the pulse voltage to be applied, and is 5 to 20 nm.

In addition, as the raw material gas, a gas obtained by adding an oxygen compound gas such as carbon dioxide gas or water vapor to, for example, a mixed gas of acetylene gas and hydrogen may be used. In the same manner as in the cleaning process, a negative pulse voltage of 5 to 15 kV is applied to the metal substrate 11, and thus carbon ions and oxygen ions are implanted into the chromium metal film. When carbon ions and oxygen ions are implanted at the same time, a chromium oxycarbide film serving as the gas barrier film 12 can be formed on the surface of the chromium metal film.

In the process in which ions are implanted into the chromium metal film and the chromium carbide or chromium oxycarbide film is formed, a so-called gradient layer in which concentrations of carbon and oxygen implanted are the highest on the outermost surface and gradually reduce from the surface to a deep portion is formed. Therefore, even if chromium carbide or chromium oxycarbide film is formed on the outermost surface, the gas barrier film 12 in which chromium carbide and a chromium metal are mixed together is formed in the deep portion. According to the present invention, it can be clearly understood that such mixed films are also effective for the gas barrier film 12.

The manufacturing method can be applied for manufacturing a gas barrier film 12 including titanium, vanadium, zirconium, niobium, molybdenum, hafnium, tantalum, tungsten, and nickel, in addition to chromium, metal carbides or metal oxycarbides of, or a mixture thereof.

In addition, in a plasma atmosphere including at least one type of ions selected from among nitrogen ions, boron ions and silicon ions, when a negative bias voltage is applied to the metal substrate 11 to implant the ions, the gas barrier film 12 including any of a metal nitride, a metal boride, and a metal silicide or a mixture thereof can be formed.

Here, in FIG. 3, while a configuration in which the inductively coupled high frequency antenna 22 is disposed on one side of the metal substrate 11 has been described, it should be noted that the high frequency antenna 22 may be disposed on both sides of the metal substrate 11 and the gas barrier film 12 can be formed on both sides of the metal substrate 11 at the same time.

In addition, in the method of forming another gas barrier film 12 according to the present invention, the gas barrier film 12 including any of a metal carbide, a metal oxycarbide, a metal nitride, a metal boride, and a metal silicide or a mixture thereof can be formed on the surface of the metal substrate 11 using a chemical vapor deposition method.

Figure 4:
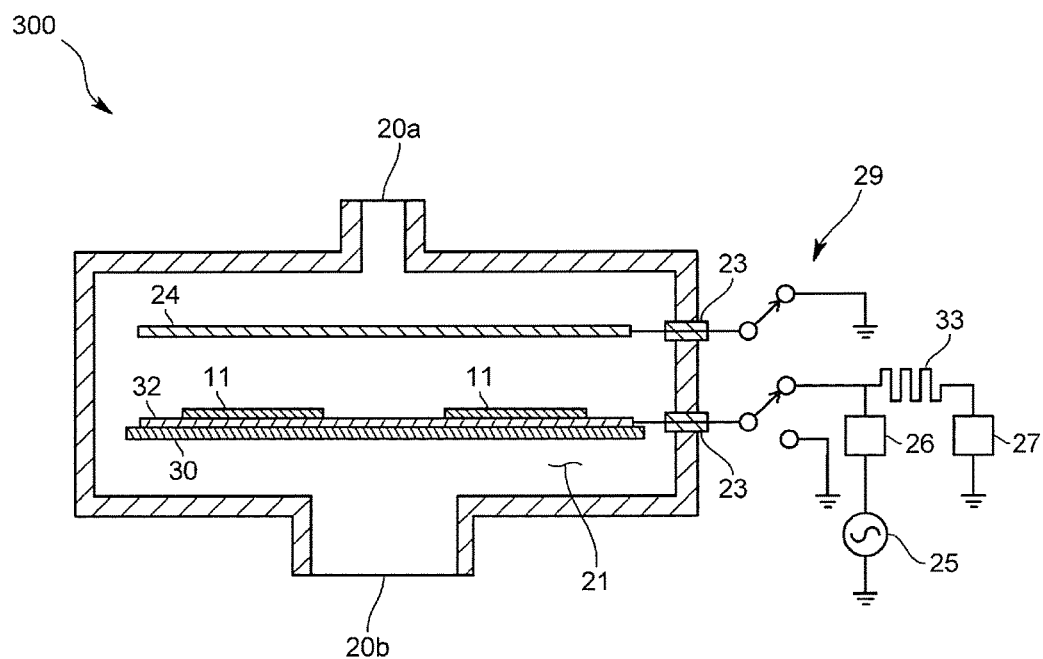
FIG. 4 is a schematic view of a configuration of a main part of another plasma treatment device according to the present invention.

FIG. 4 is a schematic view of a configuration of a main part of a plasma treatment device 300 configured to form another gas barrier film 12 according to the present invention. As an example, a method of forming another gas barrier film 12 will be described with reference to FIG. 4. The metal substrate 11 and a reticular target metal plate 24 that faces the metal substrate 11 and is made of a predetermined metal, for example, a reticular chromium metal plate, are disposed inside the plasma treatment chamber 21. The metal substrate 11 and the target metal plate 24 are connected to the high frequency power source 25 through an interlock switch 29 and the matching circuit 26 and are connected to the bias power supply 27 through a band pass filter 33. A plasma treatment device uses a so-called charge coupled plasma (CCP) scheme. 20a indicates an inlet for an operation gas and 20b indicates an outlet therefor.

When the gas barrier film 12 is formed, the metal substrate 11 for a fuel cell is transferred into the plasma treatment chamber 21 using, for example, a chain drive mechanism (not shown), the inside of the plasma treatment chamber 21 is exhausted to a high vacuum using a vacuum exhaust unit (not shown), and sufficient gas is discharged. Next, for example, a mixed gas of argon and hydrogen is introduced into the plasma treatment chamber 21 and remains at a predetermined gas pressure, high frequency power is applied to the metal substrate 11 from the high frequency power source 25 through the matching circuit 26 and the interlock switch 29 and a discharge plasma is generated in the vicinity of the metal substrate 11. Meanwhile, the target metal plate 24 is grounded. An appropriate negative bias voltage is applied to the metal substrate 11 from the bias power supply 27 through the band pass filter 33, and the surface of the metal substrate 11 can be ion bombarded for cleaning. It should be noted that, even if only high frequency power is supplied to the metal substrate 11, cleaning can be performed using a generated self-bias voltage (a negative bias voltage).

Next, the polarity is inverted using the interlock switch 29. That is, the metal substrate 11 is grounded, and the target electrode plate 24 is connected to the high frequency power source 25 and the bias power supply 27. As the raw material gas, a hydrocarbon gas, for example, a mixed gas of methane and acetylene, and argon gas are introduced into the plasma treatment chamber 21, the pressure is adjusted to a predetermined gas pressure, high frequency power is supplied to the target electrode plate 24, a discharge plasma is excited in the vicinity of the target electrode plate 24, and when a negative bias voltage is applied, the target electrode plate 24 is sputtered, and, for example, in a chromium target electrode plate, chromium atoms are sputtered and react with carbon atoms in plasma, and chromium carbide is generated and can be deposited on the surface of the metal substrate 11. The gas barrier film 12 containing chromium carbide can be formed on the surface of the metal substrate 11 through so-called reactive sputtering. It should be noted that, the gas barrier film 12 can be fo med using a generated negative self-bias voltage if only high frequency power is supplied to the target electrode plate 24, but there is an effect of enabling the gas barrier film 12 having desired characteristics to be formed by controlling a negative bias voltage.

Similarly, according to any combination of the target metal plate 24 and the raw material gas, it is possible to form the gas barrier film 12 including any of a metal carbide, a metal oxycarbide, a metal nitride, a metal boride, and a metal silicide or a mixture thereof.

Furthermore, in the method of forming another gas barrier film 12 according to the present invention, the temperature of the metal substrate 11 remains at 350 to 400° C. As the raw material gas, for example, hexacarbonyl chromium is entrained in hydrogen, and introduced into the plasma treatment chamber 21 of the plasma treatment device shown in FIG. 4. A gas pressure is adjusted to 10 to 130 Pa, high frequency power having a frequency of 13.56 MHz and an output of 100 to 500 W is applied to the metal substrate 11, a discharge plasma is generated in the vicinity of the metal substrate 11, a DC bias voltage of −50 to −400 V is supplied to the metal substrate 11, and thus a chromium oxycarbide film can be formed. In addition, another metal hexacarbonyl gas formed of hexacarbonyl nickel or hexacarbonyl tungsten can be used. It is possible to form a desired metal oxycarbide film using a so-called plasma CVD method.

When the gas barrier film 12 is formed, another chemical vapor deposition method such as a vacuum deposition method, a sputtering method, and an ion plating method can be applied in addition to the above-described formation method.

Next, processes of forming the conductive resin film 13 on the surface of the gas barrier film 12 that is formed on the surface of the metal substrate 11 will be described. A type of the conductive resin film 13 is not particularly limited. For example, a carbon-based conductive resin film including carbon-based particles as a conductive substance in a resin binder may be used and a metal-based conductive resin film including a conductive ceramic powder, metal particles, or metal compound particles such as a metal carbide and a metal nitride as a conductive substance in a resin binder may be used. A type of resin binder is not particularly limited, and a phenolic resin, epoxy resin, acryl resin, or fluorine resin having high heat resistance can be appropriately used.

The conductive resin film 13 has an effect of increasing corrosion resistance of the metal substrate 11 while preventing conductivity and current collecting properties of the separator 110 from being reduced. That is, the conductive resin film 13 is chemically passivated due to the inclusion of a defective portion of the gas barrier film 12 during coating, and corrosion resistance increases. When the thickness of the conductive resin film 13 is too thin, the corrosion resistance effect is insufficient. On the other hand, when the thickness of the conductive resin film 13 is too thick, contact resistance between the separator 110 and a gas diffusion electrode material (area resistance of the separator 110) increases and conductivity and current collecting properties decrease. Accordingly, the thickness of the conductive resin film 13 is preferably 1 to 30 μm and more preferably 3 to 15 μm.

A method of forming the conductive resin film 13 is not particularly limited. Coating can be performed on the surface of the gas barrier film 12 according to, for example, a dipping method, a spray method, an electrodeposition method, or a blade coating method. When the metal substrate 11 has a complicated gas flow path (a groove and a through hole), an electrodeposition method is advantageous in that the conductive resin film 13 with a uniform thickness is easily formed. The coated conductive resin film 13 is preferably dried and heated (burned) at 100 to 160° C. for 10 to 30 minutes. A heat treatment temperature and a treatment time differ according to a type of resin binder. When heat resistance is required, a phenolic resin, an epoxy resin, an acryl resin or a fluorine resin is preferably used.

EXAMPLES

The present invention will be described below in further detail with reference to examples. However, the present invention is not limited to the following examples and may include anything within the spirit and scope of the invention.

Example 1

As a metal substrate 11, an aluminum alloy sheet (5052) having a thickness of 0.4 mm was prepared and cut to a size of 3 cm×10 cm, ultrasonically cleaned using an organic solvent, and then locked to the substrate mounting jig 32 placed on a surface of the heating plate 30 provided inside the plasma treatment chamber 21 shown in FIG. 3. The inside of the plasma treatment chamber 21 was exhausted to a high vacuum of $10^{-2}$ Pa or less using a vacuum exhaust system (not shown). The aluminum substrate was heated on the heating plate at 30 to 350° C., and sufficient gas was discharged.

Next, a mixed gas of argon and hydrogen was introduced into the plasma treatment chamber 21, a gas pressure was adjusted to 0.8 Pa, high frequency power of 13.56 MHz and 500 W was supplied to the high frequency antenna 22 from the high frequency power source 25 through the matching circuit 26, and a discharge plasma was generated in the vicinity of an aluminum substrate. At the same time, a negative pulse voltage with a frequency of 2 kHz and a peak value of 15 kV was applied to the aluminum substrate and ion irradiation was performed for 20 minutes for cleaning.

Next, a mixed gas of methane and acetylene was introduced into the plasma treatment chamber 21, and a gas pressure was adjusted to 1.5 Pa. In the same manner as in the cleaning process, a negative pulse voltage with a frequency of 2 kHz, a peak value of 15 kV, and a pulse width of 3 μs was applied to the aluminum substrate, and a conductive DLC film serving as a conductive carbon film was formed. A conductive DLC film having a thickness of 120 nm was obtained during operation for 10 minutes. The manufacturing method was repeated, and the conductive DLC film was formed on both sides of the aluminum substrate.

A film thickness and a resistivity of the conductive DLC film were measured and evaluated using a conductive DLC film simultaneously formed on an oxide film of a surface of a silicon substrate. The resistivity was determined as 16 mΩ·cm according to a result of measurement using a four-terminal sensing method.

Next, the conductive resin film 13 was formed. In the present example, a conductive paint (trade name Everyohm 30CE-300 commercially available from Nippon Kokuen Group, hereinafter referred to as an "e-resin") including 55 weight % of graphite particles having an average particle size of about 10 μm was used. Dilution was performed with the same amount of ethanol as the conductive paint, and the conductive resin film 13 was applied to both sides of the metal substrate 11 on which the conductive DLC film was formed using an immersion method. After the application, sufficient drying was performed at room temperature, heating was then performed in air at 160° C. and baking was performed for 30 minutes. Accordingly, the conductive resin film 13 was formed and the separator 110 having a configuration of "Al/DLC/e-resin" was prepared. The thickness of the conductive resin film 13 was 16 to 24 μm and an average thereof was about 20 μm.

Example 2

As a metal substrate 11, an ALSHEET SAID (trade name, commercially available from Nippon Steel & Sumitomo Metal Corporation) having a thickness of 0.4 mm obtained by hot plating an aluminum alloy on a surface of a steel sheet was prepared, cut to a size of 3 cm×10 cm, and ultrasonically cleaned using an organic solvent. Then, a surface of the substrate was cleaned and a conductive DLC film was prepared in the same preparation process as in Example 1.

Next, in the same preparation process as in Example 1, the conductive resin film 13 was formed. In the present example, using a conductive paint (trade name Everyohm 30CE-300 commercially available from Nippon Kokuen Group) including 55 weight % of graphite particles having an average particle size of about 10 μm, the separator 110 having a configuration of "Fe/Al/DLC/e-resin" was prepared. The thickness of the conductive resin film 13 was 14 to 20 μm, and an average thereof was about 17 μm.

Example 3

As a metal substrate 11, an ALSHEET SAID (trade name, commercially available from Nippon Steel & Sumitomo Metal Corporation) having a thickness of 0.4 mm obtained by hot plating an aluminum alloy on a surface of a steel sheet was prepared, and buffing was performed on both sides. Then, the substrate was locked to the substrate mounting jig 32 placed on a surface of a heating unit 31 of the plasma treatment device shown in FIG. 3. A mixed gas of argon gas (80%) and hydrogen gas (20%) was introduced into the plasma treatment chamber 21, the pressure was adjusted to 1.5 Pa, high frequency power of 13.56 MHz and 500 W was supplied to the ALSHEET substrate from the high frequency power source 25, a discharge plasma was generated, and a surface of the substrate was cleaned. Next, a mixed gas of argon gas (40%) and methane gas (40%) was introduced into the plasma treatment chamber 21, and a gas pressure was adjusted to 1.8 Pa. When the interlock switch 29 was inverted, the ALSHEET substrate 11 was grounded, high frequency power of 13.56 MHz and 500 W and a negative pulse voltage were supplied to the target electrode (chromium metal net) 24 from the high frequency power source 25 in an overlapping manner, a discharge plasma was generated in the vicinity of the target electrode, and a mixed film including a chromium metal and chromium carbide was formed on a surface of the ALSHEET substrate 11 using a reactive sputtering method.

Next, the conductive resin film 13 was formed. In the same preparation process as in Example 2, the conductive resin film 13 (e-resin) having a thickness of 14 to 20 μm was formed, and the separator 110 having a configuration of "Fe/Al/CrC/e-resin" was prepared.

Example 4

As a metal substrate 11, a laminated substrate in which a nickel plating was performed to a thickness of 5 μm on a surface of a steel sheet having a thickness of 1.2 mm was prepared. In the same preparation process as in Example 1, the separator 110 having a configuration of "Fe/Ni/DLC/e-resin" was prepared.

Example 5

As a metal substrate 11, a laminated substrate in which nickel plating was performed to a thickness of 5 μm on a surface of a steel sheet having a thickness of 1.2 mm and which was ultrasonically cleaned using an organic solvent was prepared. Then, the substrate was locked to the substrate mounting jig 32 placed on a surface of the heating plate 30 provided inside the plasma treatment chamber 21 shown in FIG. 3. The inside of the plasma treatment chamber 21 was exhausted to a high vacuum of $10^{-2}$ Pa or less using a vacuum exhaust system (not shown), the laminated substrate was heated on the heating plate 30 at 250° C., and sufficient gas was discharged. In the same process as in Example 1, a surface of the substrate was cleaned. Next, methane gas was introduced into the plasma treatment chamber 21 and a gas pressure was adjusted to 0.8 Pa. A high frequency voltage of 500 W was supplied to the high frequency antenna 22, and a discharge plasma was generated in the vicinity of the laminated substrate 11. At the same time, a negative pulse voltage with a frequency of 2 kHz, a peak value of 15 kV, and a pulse width of 3 μs was applied to implant carbon ions. The gas barrier film 12 including nickel carbide was formed on a surface of the laminated substrate.

Next, the conductive resin film 13 was formed. In the same preparation process as in Example 2, the conductive resin film 13 (e-resin) having a thickness of 14 to 20 μm was formed, and the separator 110 having a configuration of "Fe/Ni/NiC/e-resin" was prepared.

Example 6

As a metal substrate 11, a laminated substrate in which chromium plating was performed to a thickness of 5 μm on a surface of a steel sheet having a thickness of 1.2 mm was prepared. In the same preparation process as in Example 2, the separator 110 having a configuration of "Fe/Cr/DLC/e-resin" was prepared.

Example 7

As a metal substrate 11, a laminated substrate in which chromium plating was performed to a thickness of 5 μm on a surface of a steel sheet having a thickness of 1.2 mm was prepared. In the same preparation process as in Example 5, the separator 110 having a configuration of "Fe/Cr/CrC/e-resin" was prepared.

Example 8

As a metal substrate 11, a stainless steel substrate (SUS316L) having a thickness of 0.2 mm was prepared. In the same preparation process as in Example 2, the separator 110 having a configuration of "SUS/DLC/e-resin" was prepared.

Separators including no gas barrier film 12 will be described below as comparative examples.

Comparative Example 1

As a metal substrate 11, an ALSHEET SAID (trade name, commercially available from Nippon Steel & Sumitomo Metal Corporation) having a thickness of 0.4 mm obtained by hot plating an aluminum alloy on a surface of a steel sheet was prepared and ultrasonically cleaned using an organic solvent. In the present comparative example, a conductive paint (trade name Varniphite UCC2 commercially available from Nippon Kokuen Group hereinafter referred to as a "v-resin") including 65 weight % of graphite particles having an average particle size of about 10 μm was used. Dilution was performed with the same amount of toluene as the conductive paint and the conductive resin film 13 was applied to both sides of the ALSHEET substrate 11 using an immersion method. After the application, sufficient drying was performed at room temperature, heating was then performed in air at 100° C., and baking was performed for 30 minutes. Accordingly, the conductive resin film 13 was formed, and a separator having a configuration of "Fe/Al/v-resin" was prepared. The thickness of the conductive resin film 13 was 16 to 24 μm and an average thereof was about 20 μm.

Comparative Example 2

As a metal substrate 11, an ALSHEET SAID (trade name, commercially available from Nippon Steel & Sumitomo Metal Corporation) having a thickness of 0.4 mm obtained by hot plating an aluminum alloy on a surface of a steel sheet was prepared and ultrasonically cleaned using an organic solvent. Then, in the same process as in Example 2, the conductive resin film 13 (e-resin) was directly formed on both sides thereof and a separator having a configuration of "Fe/Al/e-resin" was prepared.

Comparative Example 3

As a metal substrate 11, a laminated substrate in which chromium plating was performed to a thickness of 5 μm on a surface of a steel sheet having a thickness of 1.2 mm and which was ultrasonically cleaned using an organic solvent was prepared. Then, in the same process as in Example 1, the conductive resin film 13 (e-resin) was directly formed on both sides thereof and a separator having a configuration of "Fe/Cr/e-resin" was prepared.

Comparative Example 4

As a metal substrate 11, a stainless steel substrate (SUS316L) having a thickness of 0.2 mm which was ultrasonically cleaned using an organic solvent was prepared. Then, in the same process as in Example 1, the conductive resin film 13 (e-resin) was directly formed on both sides thereof and a separator having a configuration of "SUS316L/e-resin" was prepared.

"Evaluation Method of Contact Resistance"

Figure 5:
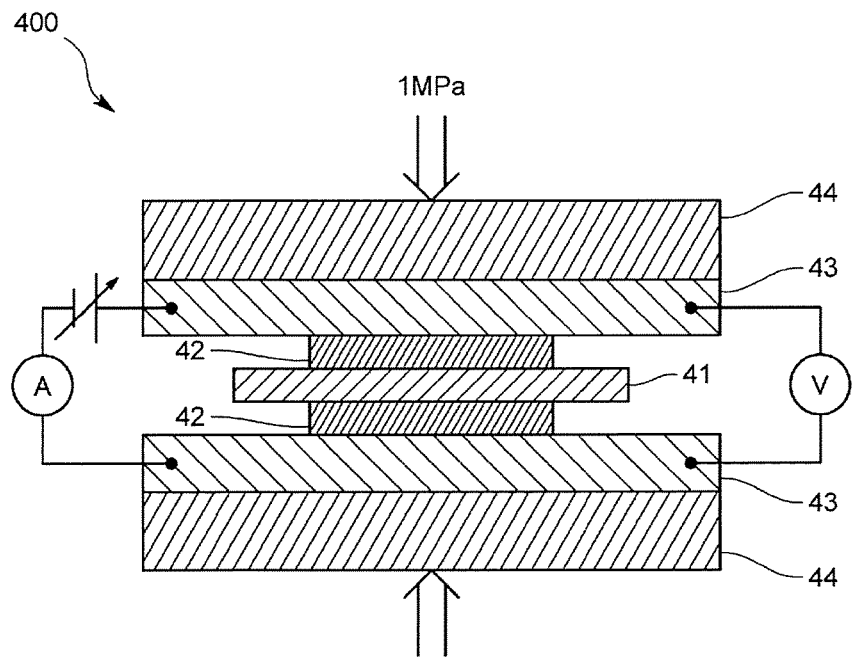
FIG. 5 is a schematic diagram for describing a method of measuring contact resistance.

Contact resistance between a separator for a fuel cell and a gas diffusion electrode material was evaluated using a measurement system 400 according to a four-terminal sensing method schematically shown in FIG. 5. Gold electrode plates 43 obtained by gold plating copper plates were used to sandwich a measurement sample 41 (the separator for a fuel cell 110) from both sides with gas diffusion electrode materials (carbon paper TGP-H-090 commercially available from Toray Industries Inc.) 42 having an area of 1 cm$^2$ therebetween. A contact resistance was evaluated from a potential difference when a load of 1 MPa/cm$^2$ was applied through a pressure plate 44 and a direct current of 1 A/cm$^2$ was applied. The contact resistances shown in Table 1 were values obtained by subtracting a contact resistance between the gas diffusion electrode material 42 and the gold electrode plate 43 measured in advance from a measured potential difference.

"Evaluation Method of Corrosion Resistance"

Regarding changes in corrosion resistance of the separator for a fuel cell 110 and the above contact resistance, a polarization test in a sulfuric acid solution at a pH of 3 and 80° C., a constant potential test in which a potential of 0.88 V was applied in a sulfuric acid solution at a pH of 3 and 80° C., and a boiling test in 1% salt water were performed.

<Polarization Test in Sulfuric Acid Solution at pH of 3 and 80° C.>

In the polarization test, an exposed area of a test piece (the separator for a fuel cell 110) was set to 1 cm$^2$, a portion other than the exposed portion was masked using insulation tape and a silicone resin for measurement. A test solution was prepared by adding dropwise high purity sulfuric acid (Wako Pure Chemical Industries, Ltd.) into deionized water and adjusting the pH to 3. An amount of the test solution was 500 ml and complete degassing was performed. A temperature of the solution was set to 80° C.

In order to obtain a polarization curve, an electrochemical measurement system (Hokuto Denko Corp. HZ5000) was used. A matching electrode was an Ag/AgCl electrode in saturated potassium chloride, and a potential sweep rate of a measuring device was set to 1 mV/s. After holding at a natural potential for 300 seconds, cathodic polarization was performed from −0.4 V to the natural potential. Then, inverting was performed and anodic polarization was performed to +1.0 V. A distance between the test piece and a reference electrode during experiment was 7 mm.

<Constant Potential Test in Sulfuric Acid Solution at pH of 3 and 80° C.>

A test solution was prepared by adding dropwise high purity sulfuric acid in deionized water and adjusting the pH to 3. An amount of the test solution was 500 ml, and complete degassing was performed. A temperature of the solution was set to 80° C. An exposed area of a test piece (the separator for a fuel cell 110) was set to 1 cm$^2$, and a portion other than the exposed portion was masked using an insulation tape and a silicone resin for measurement. A potential of 0.88 V was applied in the sulfuric acid solution at a pH of 3 and 80° C., and a change of a current value over time was measured.

<Boiling Test in 1% Salt Water>

Salt was added to deionized water to a concentration of 1% and adjusted to prepare a test solution. An amount of the test solution was 200 ml, and a degassing treatment was performed by boiling in advance. The separator 110 was immersed in salt water at 95° C. for 60 minutes. Then, a change in contact resistance, peeling of the conductive resin film 13, and a corrosion state of a substrate were evaluated.

Evaluation results for the contact resistance and the corrosion resistance of Examples 1 to 8 and Comparative Examples 1 to 4 are shown in Table 1. After surfaces were cleaned, contact resistances in case of using the surface of the aluminum substrate, the surface of the ALSHEET substrate, the surface of the iron/nickel plating substrate, the surface of the iron/chromium plating substrate and the surface of the SUS316L substrate were 14, 16, 6.2, 7.8 and 450 mΩ·cm$^2$. The contact resistance obtained after the gas barrier film 12 and the conductive resin film 13 were formed on surfaces of the substrates was 4.8 to 8.5 mΩ·cm$^2$ in Examples 1 to 7 and 11.3 mΩ·cm$^2$ in Example 8. On the other hand, the contact resistance was 70 to 760 mΩ·cm$^2$ in Comparative Examples 1 to 4 in which no gas barrier film 12 was included. In Comparative Examples 1 to 4, it was speculated that an insulating metal oxide film was formed on the surface of the metal substrate 11 while the conductive resin was burned, and the contact resistance significantly increased. In examples in which the DLC film serving as the gas barrier film 12 was formed or a nickel carbide film or a chromium carbide film was formed by implanting carbon ions, an increase in contact resistance was not observed. Effectiveness of the gas barrier film 12 was clearly exhibited.

TABLE 1

| | Configuration of separator member | Surface of raw substrate Contact resistance mΩ·cm² | Surface of gas barrier film Contact resistance mΩ·cm² | Surface of conductive resin film Contact resistance mΩ·cm² | After boiling test in 1% salt water Contact resistance mΩ·cm² | After boiling test in 1% salt water Peeling, corrosion, and discoloration |
|---|---|---|---|---|---|---|
| Example 1 | Al/DLC/e-resin | 14 | 9.5 | 8.5 | 10 | No |
| Example 2 | Fe/Al/DLC/e-resin | 16 | 8.2 | 8 | 9 | No |
| Example 3 | Fe/Al/CrC/e-resin | 16 | 7 | 5.9 | 7.4 | No |
| Example 4 | Fe/Ni/DLC/e-resin | 6.2 | 6 | 5.5 | 7.5 | No |
| Example 5 | Fe/Ni/NiC/e-resin | 6.2 | 4.5 | 5.1 | 8 | No |
| Example 6 | Fe/Cr/DLC/e-resin | 7.8 | 7 | 5.5 | 10 | No |
| Example 7 | Fe/Cr/CrC/e-resin | 7.8 | 7.5 | 4.8 | 7 | No |
| Example 8 | SUS316l/DLC/e-resin | 450 | 9 | 11.3 | 14.5 | No |
| Comparative Example 1 | Fe/Al/v-resin | 16 | | 75 | 113 | |
| Comparative Example 2 | Fe/Al/e-resin | 16 | | 760 | 933 | |
| Comparative Example 3 | Fe/Cr/e-resin | 7.8 | | 70 | 77 | |
| Comparative Example 4 | SUS316L/e-resin | 450 | | 217 | 282 | |

Figure 6:
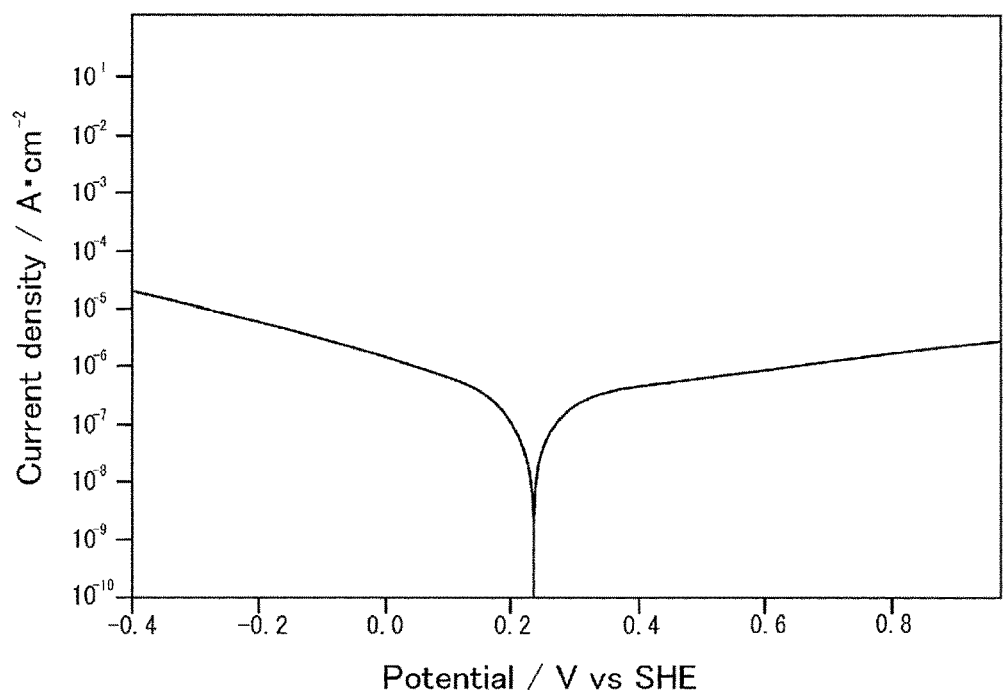
FIG. 6 is a diagram showing results of a polarization test of an electrode member according to the present invention.

A polarization test of a sample (Example 2) in which a conductive DLC film was formed on a surface of the ALSHEET substrate and the conductive resin film 13 was formed on the surface was performed in a sulfuric acid solution at a pH of 3 and 80° C. The result is shown in FIG. 6. A current density was 0.5 to 1 μA/cm when a potential of 0.4 to 0.6 V was applied to the sample. In addition, a natural potential was 0.3 V, which was almost the same as a natural potential (about 0.25 V) of graphite particles included in the conductive resin film 13, a surface of the aluminum substrate was completely covered with the DLC film and the conductive resin film 13, and it was shown that a current was flowed through graphite particles. For example, when the sample was used as the separator for a fuel cell 110, it was shown that deterioration of power generation characteristics due to elution of substrate metal elements did not occur. In addition, the polarization characteristics shown in FIG. 6 were not specific to a member configuration of Example 2, and almost the same characteristics were exhibited in the other examples and comparative examples.

Figure 7:
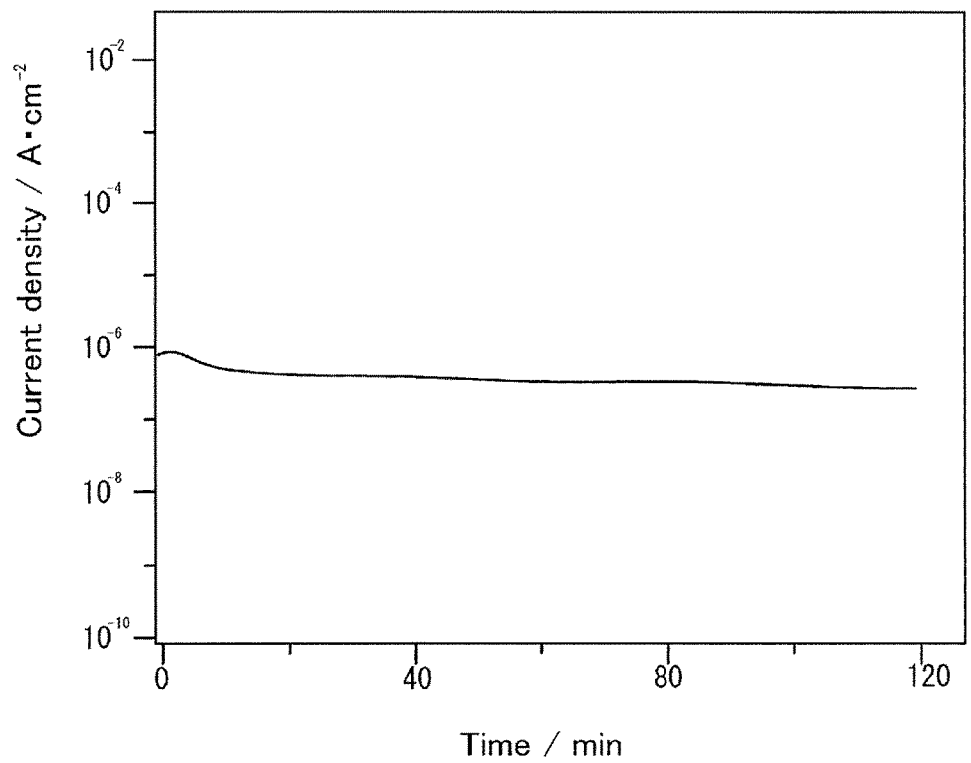
FIG. 7 is a diagram showing constant potential measurement results of an electrode member according to the present invention.

A constant potential test of the sample of Example 2 was performed in a sulfuric acid solution at a pH of 3 and 80° C. The result is shown in FIG. 7. A potential of 0.88 V was applied to the separator 110 and a change in current for 120 minutes was shown. A current density decreased from about 0.9 μA/cm² to 0.6 μA/cm² about 20 minutes after a potential was applied, and was then constant until the end time for 120 minutes. No surface discoloration, peeling, corrosion and the like were observed in visual examination.

As described above, in the separator for a fuel cell 110 according to the present invention, the gas barrier film 12 and the conductive resin film 13 were laminated on a surface of an inexpensive substrate made of iron or aluminum. Therefore, an extremely low contact resistance between the separator for a fuel cell 110 and the gas diffusion electrode material (for example, carbon paper TGP-H-090 commercially available from Toray Industries Inc.) of about 5 mΩ·cm² could be obtained. According to the result of the constant potential test for 120 minutes in the sulfuric acid solution at a pH of 3 and 80° C., which was a corrosion resistance accelerated test, it was confirmed that a current value was constant and did not change over time. The separator 110 of the present invention had highly favorable corrosion resistance and there was a contact resistance which hardly changed. It was confirmed that the fuel cell using the separator 110 of the present invention can operate for a long time.

INDUSTRIAL APPLICABILITY

According to the present invention described above, when a gas barrier film and a conductive resin film are laminated on a surface of an inexpensive metal substrate made of aluminum or iron, it is possible to provide a separator or a current collecting member for a solid polymer electrolyte fuel cell which has excellent corrosion resistance and low contact resistance. In addition, it is possible to provide a manufacturing method that is excellent for productivity. Furthermore, it is possible to provide a solid polymer electrolyte fuel cell using the separator or current collecting member for a fuel cell manufactured according to the present invention and an electrode member for the fuel cell at low cost.

What is claimed is:

1. A method of manufacturing a separator for a fuel cell or a current collecting member for a fuel cell comprising:
    (a) process in which a metal substrate for a fuel cell is transferred into a plasma treatment chamber;
    (b) process in which a surface of the metal substrate is cleaned using a plasma treatment method while the metal substrate is heated to between 100° C. and 450° C.;
    (c) process in which a conductive gas barrier film is formed on a surface of the metal substrate through inductively coupled plasma, wherein the conductive gas barrier film is a film formed by conductive amorphous carbon or conductive diamond-like carbon having a resistivity of 0.01 Ω·cm to 10 Ω·cm; and
    (d) process in which a conductive resin film is formed on a surface of the conductive gas barrier film.

2. The method of manufacturing a separator for a fuel cell or a current collecting member for a fuel cell according to claim 1, wherein a raw material gas required for forming a conductive carbon film is introduced into the plasma treatment chamber and a discharge plasma containing carbon ions is generated, the metal substrate is exposed to the discharge plasma, a negative bias voltage is applied to the metal substrate, and the conductive gas barrier film including the conductive carbon film is formed.

3. The method of manufacturing a separator for a fuel cell or a current collecting member for a fuel cell according to claim 1,
wherein the conductive gas barrier film further includes any of a metal carbide, a metal oxycarbide, a metal nitride, a metal boride, and a metal silicide or a mixture thereof.

4. The method of manufacturing a separator for a fuel cell or a current collecting member for a fuel cell according to claim 1,
wherein in a plasma atmosphere including at least one type of ions selected from among carbon ions, oxygen ions, nitrogen ions, boron ions and silicon ions, when a negative bias voltage is applied to the metal substrate and the ions are implanted, the conductive gas barrier film further including any of a metal carbide, a metal oxycarbide, a metal nitride, a metal boride, and a metal silicide or a mixture thereof is formed.

5. The method of manufacturing a separator for a fuel cell or a current collecting member for a fuel cell according to claim 1,
wherein a metal hexacarbonyl gas including a desired metal is introduced into the plasma treatment chamber as a raw material gas, and
a temperature of the substrate remains at 130° C. to 450° C. in an atmosphere in which the gas is included, and the conductive gas barrier film further including a desired metal film, metal carbide film, or metal oxycarbide film, or a mixture film thereof is formed.

* * * * *